United States Patent

Gaskill

[11] Patent Number: 5,877,744
[45] Date of Patent: Mar. 2, 1999

[54] SINGLE BUTTON CONTROL FOR INFORMATION DISPLAY

[75] Inventor: Garold B. Gaskill, Tualatin, Oreg.

[73] Assignee: Seiko Communication Systems Inc., Beaverton, Oreg.

[21] Appl. No.: 798,388

[22] Filed: Feb. 7, 1997

[51] Int. Cl.[6] .................................................. G09G 5/08
[52] U.S. Cl. ........................ 345/146; 345/356; 345/357
[58] Field of Search ................................. 345/146, 115, 345/119, 123, 356, 357, 901, 903

[56] References Cited

U.S. PATENT DOCUMENTS

| | | | |
|---|---|---|---|
| 2,175,488 | 10/1939 | Stoll | 155/169 |
| 2,310,346 | 2/1943 | Bell | 155/94 |
| 2,411,063 | 11/1946 | Scott | 155/158 |
| 4,657,305 | 4/1987 | Meiller | 297/417 |
| 4,668,010 | 5/1987 | Fujiwara | 297/150 |
| 4,848,840 | 7/1989 | Toya | 297/417 |
| 5,316,373 | 5/1994 | Markel | 297/411.32 |
| 5,396,264 | 3/1995 | Falcone et al. | 345/146 |
| 5,534,888 | 7/1996 | Lebby et al. | 345/901 |
| 5,596,348 | 1/1997 | Hayakawa | 345/146 |
| 5,627,531 | 5/1997 | Posso et al. | 345/148 |
| 5,661,635 | 8/1997 | Huffman et al. | 345/901 |

FOREIGN PATENT DOCUMENTS

1198396  12/1959  France ................................. 297/357

Primary Examiner—Matthew Luu
Attorney, Agent, or Firm—Elmer Galbi

[57] ABSTRACT

Small electronic information storage and display devices such as paging devices with a limited number of control buttons allow user navigation of complex data structures by use of a single control button. Where a user has opportunity to branch within the data structure, the duration of control button actuation determines the selected branch. During the predetermined time interval, the user has visual indication of the item to be next displayed if the user maintains actuation of the control button. In this manner, a single control button supports navigation functions as might normally be established by two buttons such as a cursor right button and a cursor down button. Incorporating a second control button under the present invention supports a cursor left and a cursor up button. In this fashion, navigation of complex data structures occurs naturally and intuitively without requiring more than a limited number of control buttons.

14 Claims, 6 Drawing Sheets

SINGLE BUTTON CONTROL FOR INFORMATION DISPLAY

FIELD OF THE INVENTION

The present invention relates generally to information display devices, and particularly to small information display devices having by nature a limited number of user interface or control buttons.

BACKGROUND OF THE INVENTION

As technology advances the overall size of electronic devices shrinks. For electronic devices small by nature, e.g., paging devices, advancing technology significantly increases capability and function. For example, sophisticated paging devices are now available in the form and size of a conventional wristwatch with significant memory storage and information display capabilities.

In one important area, however, size reduction provides limited additional advantage. The user interface, i.e., user-operated buttons, must remain at sufficient size to allow user manipulation of the electronic device. Thus, even where overall size is reduced and electronic capabilities are increased, e.g., a paging device integrated into the form of a wristwatch, user-operable buttons remain at least at a minimal size to support user manipulation. Control buttons must be sufficiently large to allow activation by the user's finger tip. Because of significant overall size reduction, the number of such user-operable buttons is severely limited.

In the case of paging devices, for example, early paging devices could display a paging message received, but upon receipt of the next paging message the previous paging message was lost for lack of storage capability. Soon, however, paging devices stored several of the most recently received paging messages. Due to storage capacity limitations, however, only a limited number of paging messages could be stored. The user could review the stored messages as a simple list of items. For such a simple information structure, i.e., a limited number of items stored as a serial list, a limited number of control buttons allowed user manipulation of the paging device to review the stored paging messages. For example, pressing a single control button while in a display mode moves the display to the next item in the relatively small serial list of stored paging messages.

As paging technology advances, however, paging devices have acquired significantly greater storage capabilities. Accordingly, paging devices, even highly miniaturized paging devices in the form of a wristwatch, store significantly more paging messages and make available such information for review by the paging device user. Furthermore, paging message content has diversified into a variety of categories. Information subscriptions available through a paging service include, for example, sports information, financial information, weather information, and news information. Also, a paging service can notify the user of new voice mail and electronic mail. Paging devices receiving and storing such rich information content hold a relatively complex database of information ranging from personal paging messages to information in a variety of categories such as financial, sports, weather and the like.

As the storage capability and variety of message type categories increases, the complexity of the data structure holding the stored paging messages necessarily increases. For example, storage of paging messages should take into account the message type. A data structure including "folders" or directories holding messages of a given category helps organize the stored paging messages according to user interest. As the user displays stored paging messages, review of only certain categories of interest at that time, e.g., financial information taken from the financial folder, should be possible without review at that time of unrelated paging messages, e.g., weather information in the weather folder. Also, new or unread paging messages should be available for review separate from previously read paging messages.

Similarly, the task of reviewing such rich information structures becomes more complex, especially in the context of a small electronic device with a limited number of control buttons. A serial list of all stored paging messages and single button operation to move serially through the entire list allows access to the entire list, but quickly becomes unacceptable due to the complexity and diversity of the stored information. Simple control schemes become burdensome or impossible when paging messages are stored in more sophisticated data structures, e.g., structures including "folders" holding categories of paging messages. More sophisticated control schemes taking into account the nature and structure of the stored paging messages are possible, but typically require use of more than one control button, and/or complicated or dynamic control button function assignment. For some applications, joy sticks and multiple control buttons have been used. Other applications have proposed use of four to eight direction buttons and an enter or accept button to navigate through complex data structures. With space so important and limited on small electronic information storage and display devices, it can be hard for the user to tell which button to push and when to push it. Preferably, user navigation or review of complex data structures should be natural and obvious to avoid user confusion and increase user satisfaction.

Generally, an acceptable control scheme must be simple and intuitive, not requiring the user to memorize button function assignments and preferably not requiring the user to manipulate more than a limited, and most preferably only one, control button.

Thus, advancing technology provides significant increase in the amount and type of information available for display in small information display and storage devices, but has not made more simple the user's task in reviewing such information due to the limited number of control buttons available on such small electronic devices. The subject matter of the present invention provides the user an ability to more easily review complex information structures by use of a single control button.

SUMMARY OF THE INVENTION

An information storage and presentation device according to the present invention includes an information storage portion holding a data structure of information items. The data structure includes at least one navigational branch point providing opportunity to navigate from a current information item to a first potential next item or to a second potential next item. The device also includes a presentation portion and at least one control button. A control portion responds to the control button to navigate through the data structure and present information items when encountered. Upon encountering a branch point, the control portion monitors actuation and release of the control button. A Upon detecting actuation of the control button, the control portion starts a predetermined time interval. The control portion selects the next item to be presented as a function of the control button release in relation to expiration of the time interval. For example, the control portion selects the first potential next item upon detecting release of the control button during the time interval and selects the second potential next item upon detecting release of the control button following expiration of the time interval. According to one aspect of the present invention, the control portion indicates during the time interval the next item to be presented.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
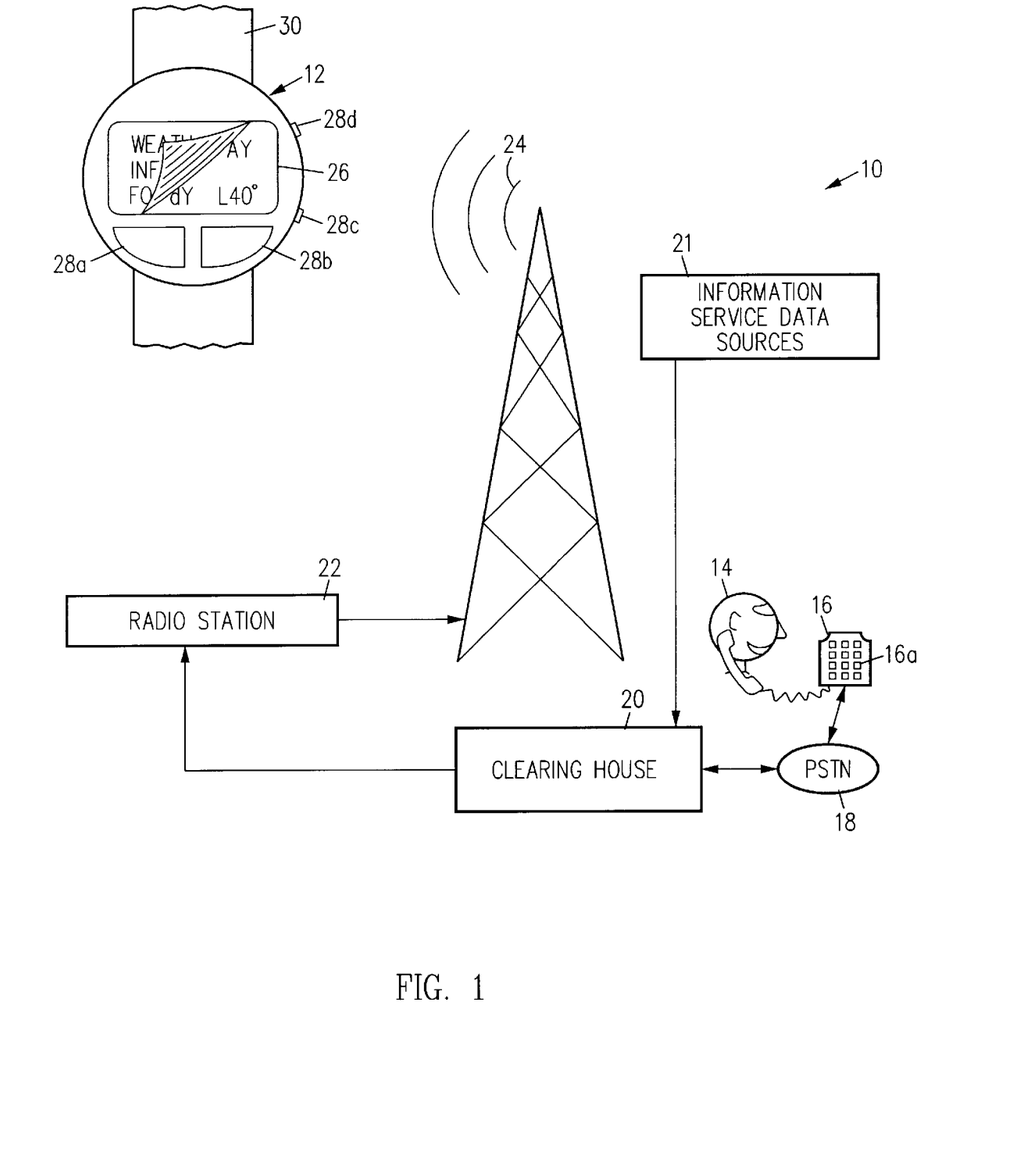
FIG. 1 illustrates a paging system including paging devices employing single button control for information display according to a preferred embodiment of the present invention.

FIG. 1 illustrates a paging system 10 including a population of paging devices 12, only one such paging device 12 being illustrated in FIG. 1. Paging system 10 receives paging information from callers 14 interacting, by way of conventional telephones 16 and a public switch telephone network (PSTN) 18, with a clearinghouse 20. System 10 also receives paging information from information service data sources 21. Information service data sources 21 represent a variety of information sources available to paging system 10 for delivery on a subscription basis to paging devices 12. Clearinghouse 20 submits such paging information to radio stations 22, only one such radio station 22 being shown in FIG. 1, for transmission as radio signal 24. For purposes of the present disclosure, it will be understood that a variety of information in a variety of categories, e.g., sports, financial, weather, and the like, may be broadcast through system 10 to paging devices 12. As described more fully hereafter, each paging device 12 collects paging information and stores such information in a hierarchical data structure (FIG. 3) according to such categories.

Paging devices 12, in the illustrated embodiment, take the form of a wristwatch and the wristband constitutes an antenna 30. Each paging device 12 includes an LCD display 26 for presentation of paging messages and includes a limited number of control buttons 28, individually 28a–28d, for user manipulation of the paging device 12. The primary control buttons 28 provided for user manipulation of paging device 12, however, are buttons 28a and 28d, i.e., the only buttons 28 on the face of paging device 12. Because the present invention allows review of stored paging messages using a limited number of, i.e., one, control buttons 28 in reviewing stored paging information, buttons 28c and 28d need not be discussed further herein.

Figure 2:
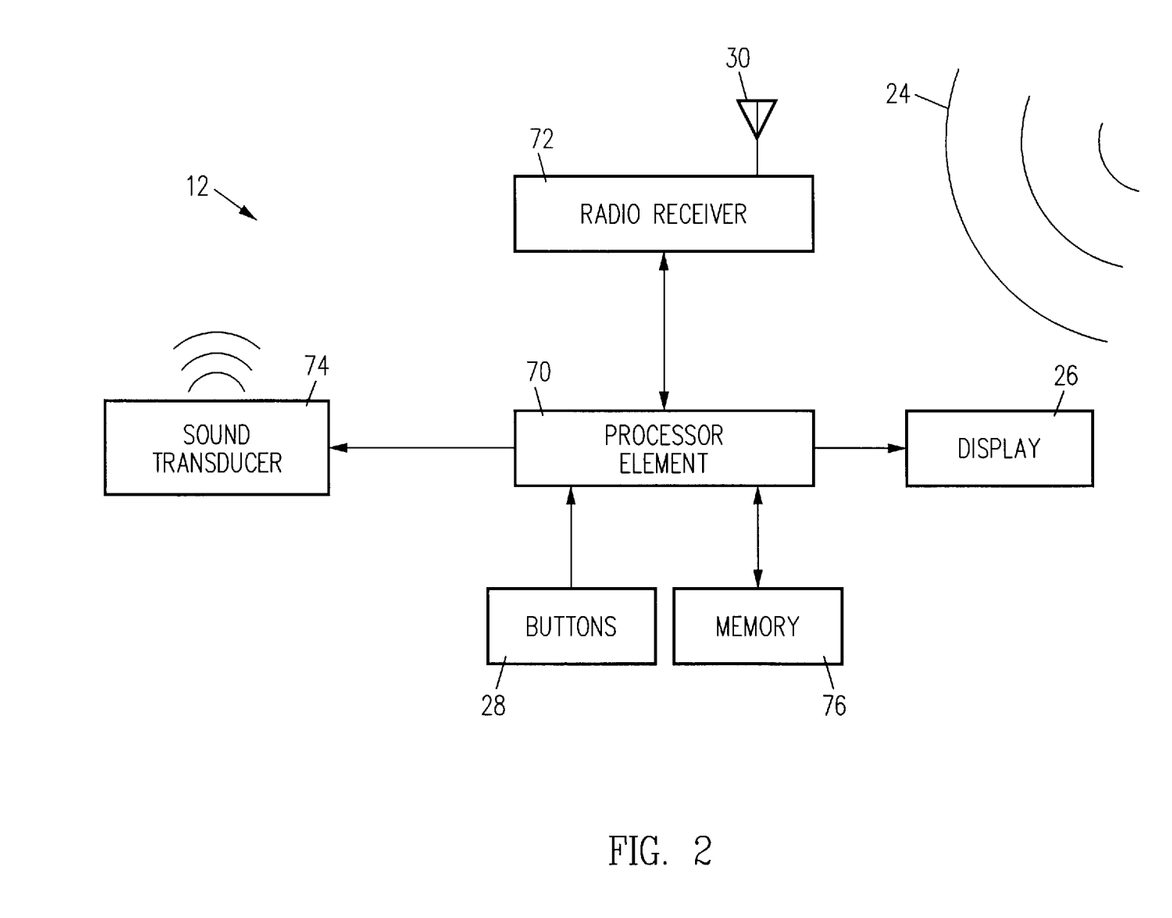
FIG. 2 illustrates in block diagram internal components including a processor element of the paging device of FIG. 1.

FIG. 2 illustrates in block diagram the paging device 12 of FIG. 1. In FIG. 2, a processor element 70 controls operation of paging device 12. Processor element 70 drives LCD display 26 for presentation of various information, i.e., stored paging messages as pertaining to the present invention. A radio receiver 72 couples to antenna 30 and receives radio signal 24. Processor element 70 interacts with radio receiver 72 to receive and store paging information obtained from radio signal 24. Processor element 70 monitors user-operation of buttons 28 to detect and decode user manipulation or control of paging device 12. Processor element 70 selectively activates a sound transducer 74, i.e., alarm, to indicate receipt of new paging information. Finally, processor element 70 interacts with a memory 76 supporting operation of paging device 12, i.e., storing and accessing paging messages in a hierarchical data structure as described more fully hereafter.

Figure 3:
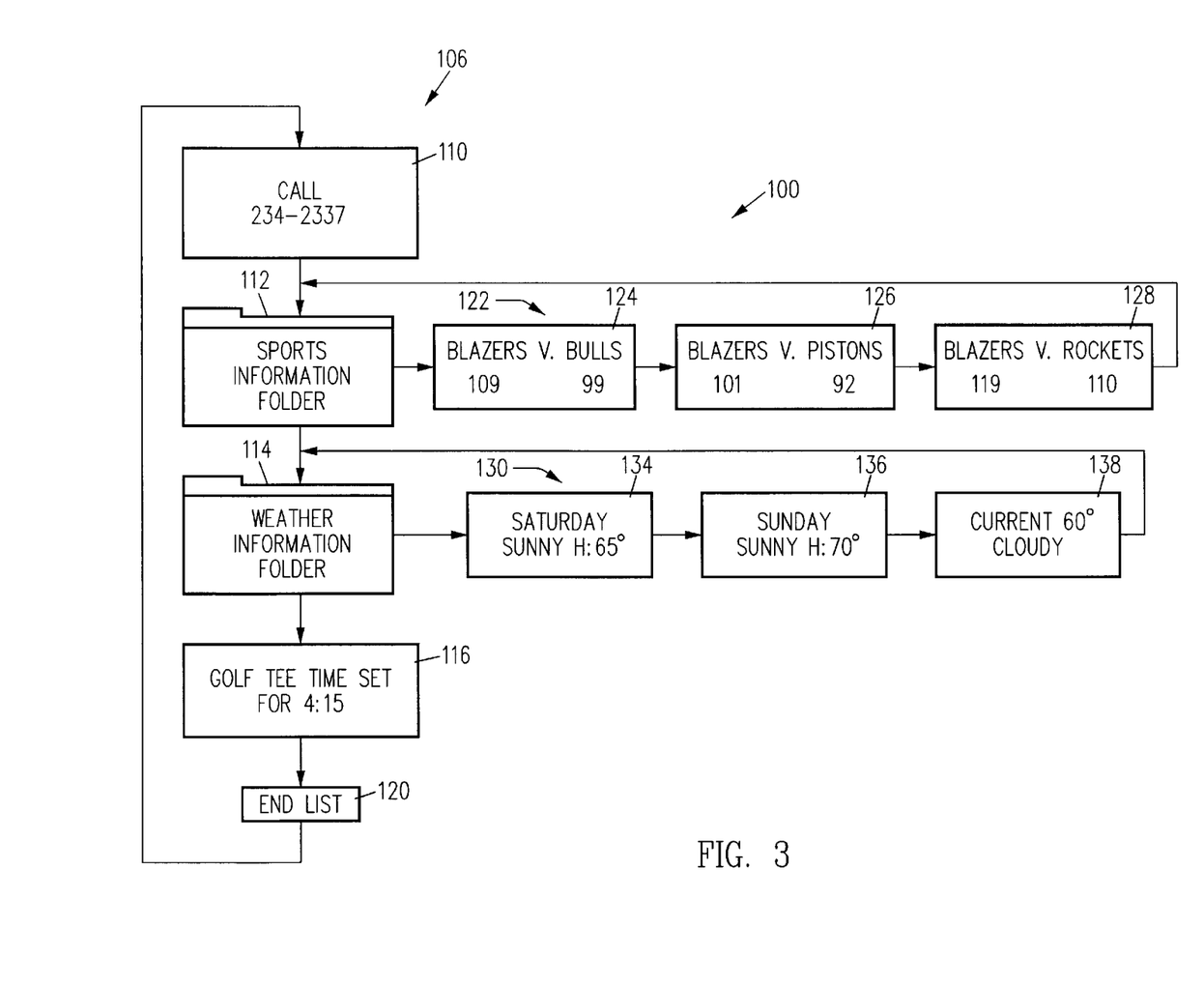
FIG. 3 illustrates a data structure storing paging messages within the paging device of FIG. 1.

FIG. 3 illustrates a data structure used to store and display paging messages held by paging device 12. Generally, structure 100 may be viewed as a complex linked list of items where each item can be an actual paging message or can be a "folder" or "directory", i.e., a pointer to sub-list. In the illustrated example, a root level list 106 includes a paging message 110, an information service folder 112, an information service folder 114, a long text paging message 116, and an end-of-list marker 120. Thus, root level list 106 may be traversed by moving from item 110 to item 112 to item 114 to item 116 and, when encountering the end-of-list marker 120, returning to item 112. Information service folders 112 and 114 indicate additional paging messages stored by paging device 12. Each of folders 112 and 114 correspond to a particular one of several information service categories, in the present example sports and weather categories. Information service folder 112 points to a sub-list 122 including paging messages 124, 126, and 128 organized as a linked list where header 112 points to message 124, message 124 points to message 126, message 126 points to message 128 and message 128 points back to information service folder 112. Similarly, information service folder 114 points to a sub-list 130 including individual messages 134, 136, and 138 organized as a linked list where information service folder 114 points to message 134, message 134 points to message 136, message 136 points to message 138, and message 138 points back to information service folder 114.

Thus, it will be understood that the data structure 100 illustrated in FIG. 3 may be employed to hold a variety of paging messages in a variety of categories where messages in similar categories are grouped in sub-lists associated with a folder in the root level list 106. Additional folders may be added to list 110 to include additional information in additional categories and additional individual paging messages may be added to root level list 106 or to any sub-list. Furthermore, it will be understood that data structure 100 may accommodate additional folders within sub-lists whereby sub-categories of information may be organized within such sub-folders. The particular content illustrated for data structure 100 includes folders only in the root level list 106, however, additional folders may be incorporated into any linked list in data structure 100.

Because information stored by paging device 12 is complex and includes information in a variety of categories, data structure 100 allows organization of such information in a meaningful fashion allowing a user to review information by category or content. For example, if a user is interested in a particular information service, then messages stored within a folder corresponding to that service may be reviewed by first traversing root level list 106 to reach the information service folder of interest, then traversing the corresponding sub-list. Generally, in traversing data structure 100, the user moves along lists and, when encountering a folder, has opportunity to branch from that list into a subordinate list. Furthermore, while illustrated herein with a single root level list 106 and only two sub-lists 122 and 130, it will be understood that data structure 100 can accommodate any number of paging messages organized in such hierarchical structure by category or content of information or by read or unread status.

The present invention provides a mechanism and method for traversing data structure 100 using a single one of control buttons 28. Generally, once a paging device 12 enters a display mode, one of the paging messages or a folder in data structure 100 appears on display 26 of paging device 12. The user, by manipulation of button 28b for example, moves forward in the particular list or sub-list by pressing and quickly releasing button 28b. Pressing and holding button 28b for a given time interval, however, allows the user to branch to a different portion of data structure 100 when available, i.e., when the current item is a folder the user can branch into the associated sub-list. For example, if information service folder 112 is currently displayed, i.e., a folder holding sports information, the user moves ahead in root level list 106 by pressing and quickly releasing button 28b. If, however, the user wishes to enter sub-list 122, the user holds button 28b in its depressed state for a predetermined time interval, e.g., one second, and the next display is paging message 124. To give the user a visual indication of the next item to be displayed if button 28b remains depressed, the present invention contemplates display or partial display of the next item during the given time interval. Thus, if a user upon depressing button 28b sees an item not of interest, then the user quickly releases button 28b before the predetermined time interval expires and the display advances to the next item in the current list. In this manner, if a user wishes to continue review of a given item, the user merely maintains actuation of button 28b until the predetermined time interval expires. If, however, the user finds no interest in the displayed item, or partially displayed item, shown during the predetermined time interval, the user merely releases button 28a and continues advancing through the current list or sub-list.

Figure 4:
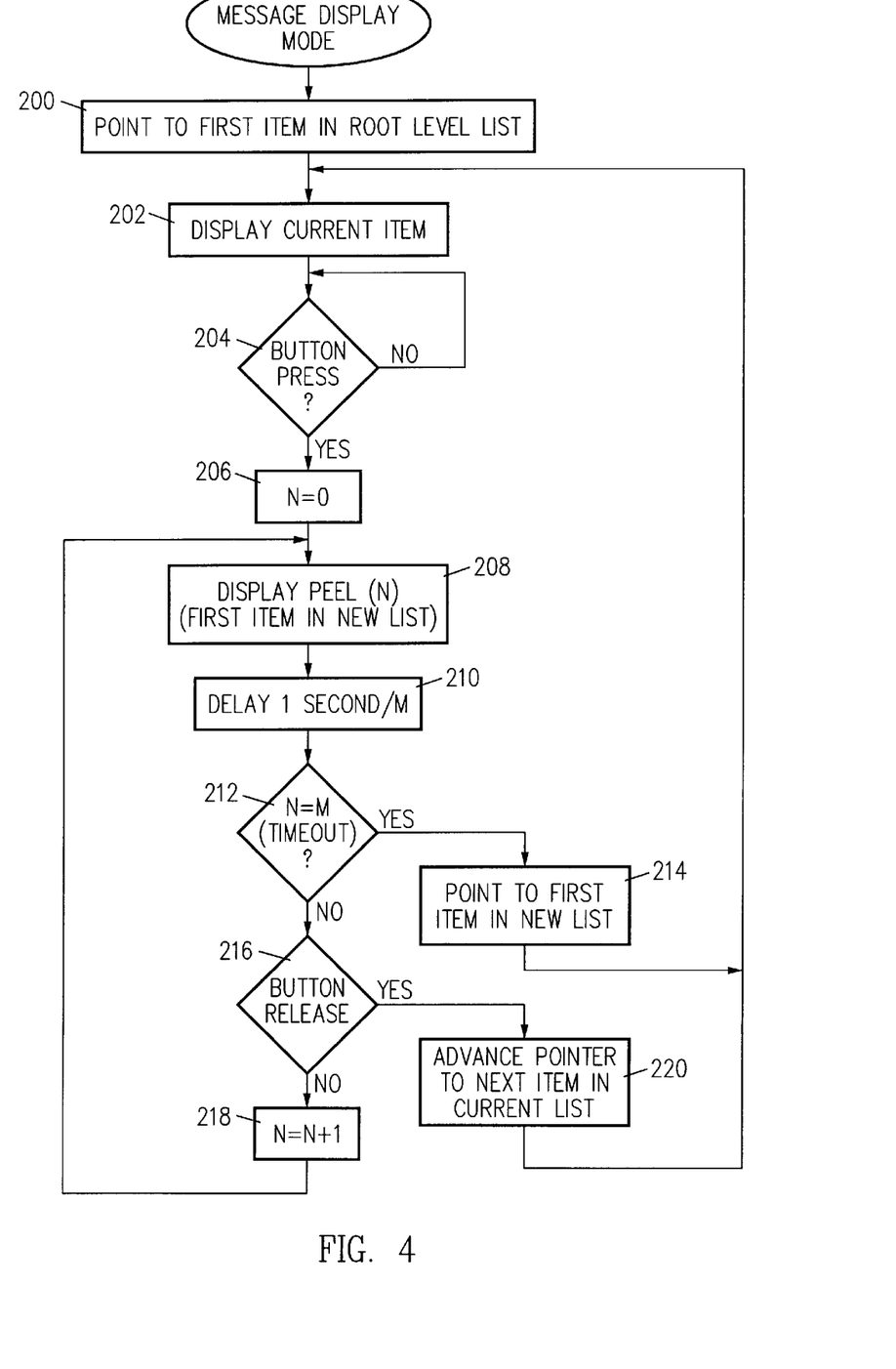
FIG. 4 illustrates programming for the processor element controlling the paging device of FIG. 1 in implementation of a preferred embodiment of the present invention allowing single button control for display of the information contained in the data structure of FIG. 3.

FIG. 4 illustrates by flow chart programming for processor element 70 supporting user review or traversal of data structure 100 using only control button 28b. In FIG. 4, paging device 12 has entered a message display mode and in block 200 processor 70 points to the first item in root level list 106, i.e., points to paging message 110, as the current item. Processing then advances to block 202 where processor element 70 displays the current item. In the initial execution of block 202 processor element 70 displays paging message 110. Processing then advances to decision block 204 and loops thereat until the user first depresses control button 28b. When the user depresses control button 28b, processing advances to block 206 where processor element 70 sets a variable N to zero. Variable N serves as a counter value in conjunction with variable M, a partial-second delay factor, to establish the predetermined time interval following actuation of control button 28b and dictating whether the user has elected to continue advancing through a given list or branch from a folder to a sub-list.

Continuing to block 208, processor element 70 executes a DISPLAY_PEEL function passing the value of variable N thereto. The DISPLAY_PEEL function takes into account the current item and partially displays a potential next item to be displayed, i.e., an item to be next displayed if the user maintains actuation of control button 28b through the predetermined time interval. In other words, if the current item is a folder then the DISPLAY_PEEL function partially displays the first item in the sub-list associated with that folder. If the current item is not a folder, i.e., a paging message, then the DISPLAY_PEEL function begins, for example, partial display of a blank screen on LCD display 26. The DISPLAY_PEEL function uses the value of variable N to determine the extent of partial display, i.e., to what extent the potential next item to be displayed is shown on LCD display 26.

In block 210, processor element 70 delays processing for a selected interval. In the illustrated embodiment, block 210 executes a delay, i.e., partial-second delay calculated as one second divided by the value of variable M. Following block 210, processing advances to block 212 where processor element 70 compares the value of variable N to the value of variable M. When these values match, a time-out condition has occurred and processing branches from decision block 212 to block 214. When such time-out condition has occurred, the user has maintained actuation of control button 28b through the predetermined time interval, i.e., one second in the illustrated embodiment, and has indicated desire to branch to a sub-list, i.e., fully display the item previously partially displayed by the DISPLAY_PEEL function. Accordingly, in block 214, processor element 70 points to the first item in the new list assuming that the previous current item was a folder. If, however, the current item was not a folder, then block 214 would not advance the pointer to a new item. In essence, the display would return to the same information item. Processing then returns from block 214 to block 202 where processor element 70 displays the new current item.

If, however, decision block 212 determines that a time-out condition has not yet occurred then processing advances to decision block 216 where processor element 70 determines whether a button release condition has occurred, i.e., whether the user has at this time released control button 28b. If the user has not yet released control button 28b, then processing advances through block 218 where the variable N is incremented and processing returns to block 208 where the DISPLAY_PEEL function again executes, but with a new value for the variable N and therefore a larger partial display of the potential next item to be displayed. If, however, decision block 216 determines that a button release condition has occurred, then processing advances to block 220 where processor element 70 advances its pointer to the next item in the current list, i.e., the user has indicated desire to advance to the next item in the current list and not accept the option partially displayed by DISPLAY_PEEL function. Following block 220, processing returns to block 202 where processor element 70 displays the new current item, i.e., the next item in the current list.

Thus, programming shown in FIG. 4 allows a user to navigate through a complex information data structure. When the user first depresses control button 28b, display 26 shows or partially shows to the user what will be the next display item should the user maintain actuation of control button 28b through the predetermined time interval, i.e., for at least one second in the illustrated embodiment. If the user does not wish to display the proposed next item, the user simply releases control button 28b prior to expiration of the predetermined time interval. The user thereby indicates desire to advance to the next item in the current list. In other words, the user dictates branching or navigation through data structure 100 by the length of time control button 28b remains depressed. By repeatedly pressing and quickly releasing button 28b, the user quickly advances serially through a given list or sub-list. When a user sees an item of interest partially displayed during the predetermined time interval, however, the user need only maintain actuation of control button 28b for duration of the predetermined time interval to execute a branch from a given list, i.e., branch at a folder to a sub-list.

Figure 5A:
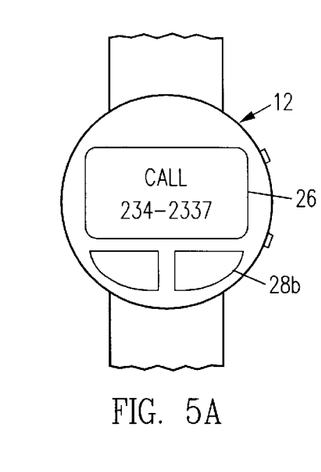
FIGS. 5A–5F and FIGS. 6A–6F illustrate a sequence of displays presented to a user by the paging device of FIG. 1 in traversing the data structure of FIG. 3.
Figure 5B:
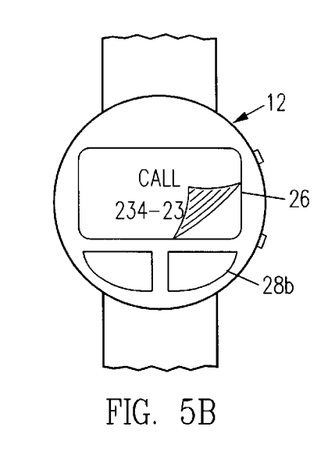
Figure 5C:
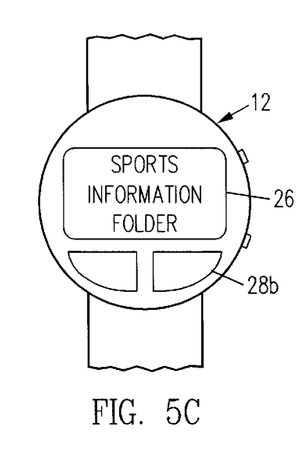
Figure 5D:
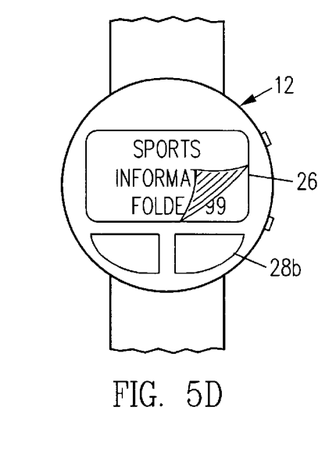

FIGS. 5A–5F illustrate paging device 12 as processor 70 executes the programming of FIG. 4 and the user selects a path through the data structure 100. In FIG. 5A, paging device 12 has entered its display mode and the first message, i.e., message 110, appears on display 26 of paging device 12. FIG. 5B illustrates display 26 presentation when the user first depresses control button 28b. More particularly, the DISPLAY_PEEL function has executed and the presentation of message 110 is "peeled back" on display 26. In the illustrated scenario, the user has decided to advance to the next item in root level list 106 and has released control button 28b before the end of the predetermined time interval, i.e., has released button 28b before expiration of the one-second interval. As shown in FIG. 5C, the next item in the current list, i.e., the sports information folder 112, appears on display 26. Thus, the transition from the presentation in FIG. 5B to the presentation in FIG. 5C corresponds to a press and quick release operation by the user moving the display serially through the current list. FIG. 5D illustrates display 26 presentation when the user first depresses control button 28b when the sports information folder 112 appears on display 26. More particularly, the sports information folder presentation is "peeled back" on display 26 exposing partially the first member in the associated sub-list, i.e., exposing message 124 in sub-list 122.

Figure 5E:
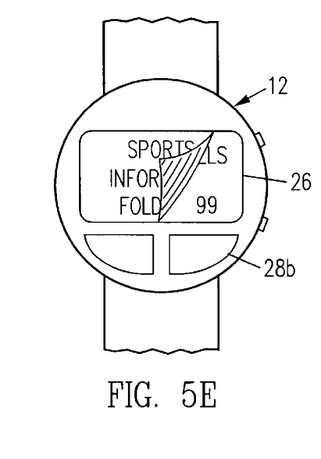
Figure 5F:
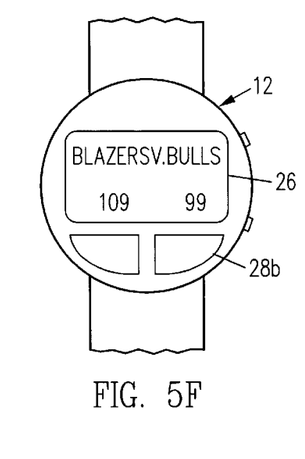

The user, in this particular scenario, decides to review the paging messages held in sports information folder 112. Accordingly, the user maintains actuation of control button 28b. FIG. 5E illustrates display 26 presentation partially through the predetermined time interval where the sports information folder 112 presentation is further "peeled back" and the message 124 is further exposed. Because the user maintains actuation of button 28b throughout the predetermined time interval, programming of FIG. 4 branches at the sports information folder 112 and accepts the first item in sub-list 122, i.e., message 124, as the current item for display. FIG. 5F illustrates paging device 12 presenting message 124 on display 126 in accordance with the user's decision to branch from the root level list 106 at the folder 112 and into the sub-list 122.

Figure 6A:
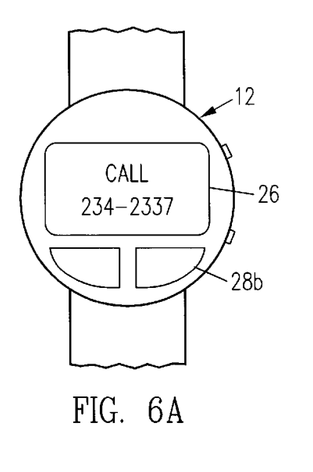
Figure 6B:
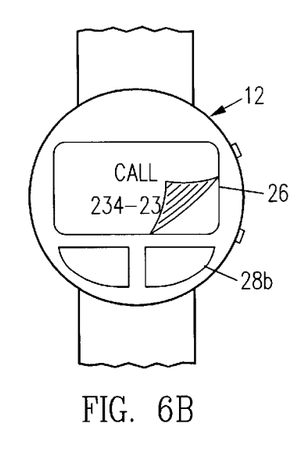
Figure 6C:
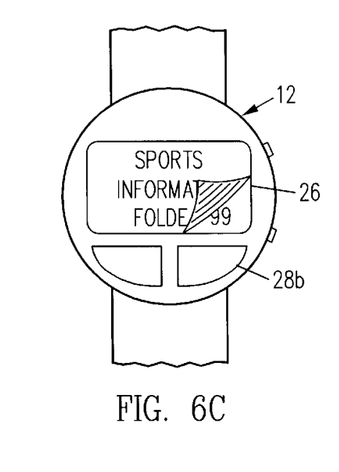
Figure 6D:
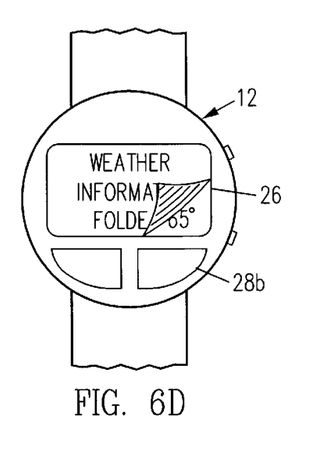
Figure 6E:
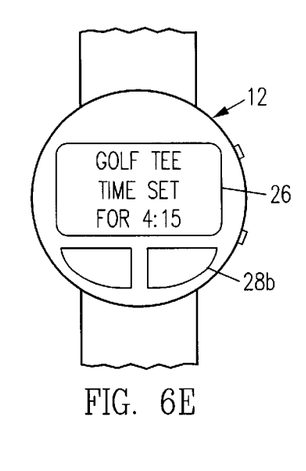
Figure 6F:
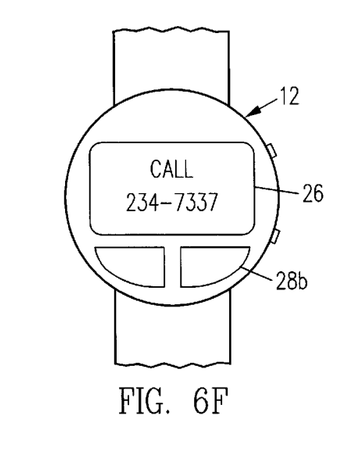

FIGS. 6A–6F illustrate user traversal of the root level list 106 by repeatedly actuating and quickly releasing control button 28b. In FIG. 6A, paging device 12 has entered its display mode and the first message, i.e., message 110, appears on display 26. FIG. 6B illustrates of paging device 12 after the user first actuates control button 28b but before release thereof. The user releases control button 28b prior to termination of the predetermined time interval and the next item in root level list 106 appears, i.e., the sports information folder 112 appears, on display 26. FIG. 6C illustrates device 12 presentation after the user has actuated control button 28b, but prior to release thereof. Accordingly, because the current display is a folder, the DISPLAY_PEEL function partially displays the first item in the associated sub-list, i.e., partially displays message 124 in sub-list 122. As the user maintains actuation of control button 28b, the portion of sports information folder 112 displayed diminishes and the portion of paging message 124 increases. Under this scenario, however, the user releases control button 28b prior to termination of the predetermined time interval and the next item in root level list 106 appears on display 26, i.e., weather information folder 114, appears on display 26. FIG. 6D illustrates paging device 12 after weather information folder 114 has appeared on display 26 and after the user has actuated control button 28b.

Because the current item displayed is a folder, while the user maintains actuation of control button 28b the first member of the associated sub-list is partially displayed on display 26, i.e., weather message 134 of sub-list 130 is partially displayed, according to the DISPLAY_PEEL function. The user declines to enter sub-list 130, however, and releases control button 28b prior to expiration of the predetermined time interval. Accordingly, the next item in the current list appears on display 26, i.e., message 116 of root level list 106 appears on display 26. The user then presses and quickly releases control button 28b to continue movement through the current list. Accordingly, the next item in the current list, i.e., message 110 in the circular linked list structure, appears on display 26. Thus, the user quickly moves serially through a given list, or sub-list, by pressing and quickly releasing control button 28b. Any time a branch opportunity occurs, i.e., when the current item is a folder, the user has visual indication of the first item in the associated sub-list and can enter that sub-list simply by maintaining actuation of control button 28b.

Use of control button 28b in the manner described herein may be thought of as a "cursor down" and "cursor right" function. Pressing and quickly releasing control button 28b constitutes a "cursor down" function. Pressing and maintaining control button 28b through the determined time interval constitutes a "cursor right" function.

Data structure 100 can be modified to include double linked lists and more complex list architecture whereby navigation through data structure 100 in up, down, right, and left directions may be desirable. Under the present invention, using only two control buttons, i.e., using only control buttons 28a and 28b four-way direction control may be implemented. More particularly, as described above, control button 28b may be thought of as a "cursor down" button and a "cursor right" button. Processor element 70 may be provided with similar programming for control button 28a wherein control button 28a implements a "cursor up" and a "cursor left" function. More particularly, pressing and quickly releasing control button 28a corresponds to a "cursor up" function wherein the pointer into data structure 100 would be moved, for example, upward in the orientation of data structure 100 as illustrated in FIG. 3. Similarly, pressing and maintaining actuation of control button 28a through a predetermined time interval implements a "cursor left" function to, for example, move leftward or backwards on any one of the linked lists.

As may be appreciated, the particular navigational scheme illustrated herein may be varied according to the specific nature of a particular data structure chosen and user interface philosophy. Generally, the present invention provides a method for navigating through a data structure where serial movement and branch points are encountered. The user, under the present invention, when encountering a branch point has opportunity to continue along a given path by quickly releasing the associated control button, or to branch from the given path by maintaining actuation of the control button.

It will be appreciated that the present invention is not restricted to the particular embodiment that has been described and illustrated, and that variations may be made therein without departing from the scope of the invention as found in the appended claims and equivalents thereof.

What is claimed is:

1. A paging device having a limited number of control buttons and storing paging messages for display in a data structure, said data structure including branch elements representing branch points each branch point requiring selection for next display between an associated first next item to be displayed and an associated second next item to be displayed, said paging device navigating through said data structure in response to at least one of said limited number of control buttons, and said paging device displaying a current one of said paging messages and said branch elements while navigating through said data structure, said paging device comprising:

a display visually presenting said current one of said paging messages and said branch elements; and a control portion responsive to said at least one of said limited number of control buttons, said control portion displaying upon said display said current one of said paging messages and said branch elements while navigating therethrough, said control portion upon encountering one of said branch elements monitoring actuation and release of said at least one of said limited number of control buttons, said control portion upon detecting actuation of said at least one control button starting a predetermined time interval and selecting one of said associated first next item to be displayed and said associated second next item to be displayed as a function of release of said control button relative to expiration of said time interval.

2. A device according to claim 1 wherein said control portion selects said associated first next item to be displayed upon detecting release of said at least one control button prior to expiration of said time interval.

3. A device according to claim 1 wherein said control portion selects said second item to be displayed upon detecting release of said at least one control button following expiration of said predetermined time interval.

4. An information storage and presentation device comprising:

an information storage portion holding a data structure of information items, said data structure including at least one navigational branch point, said branch point providing opportunity to navigate from a current information item to one of at least a first potential next item and a second potential next item;

an information presentation portion;

at least one control button;

a control portion responsive to said control button to navigate through said data structure and present at said presentation portion said information items when encountered, said control portion upon encountering said at least one branch point monitoring actuation and release of said control button, said control portion upon detecting actuation of said control button starting a predetermined time interval, said control portion selecting said first potential next item upon detecting release of said control button during said time interval, said control portion selecting said second potential next item upon detecting release of said control button following expiration of said time interval.

5. A device according to claim 4 wherein said device indicates during said time interval that said second potential next item will be selected.

6. A device according to claim 4 wherein said presenting portion is a visual display.

7. A device according to claim 4 wherein said device partially presents said second potential next item during said time interval.

8. A device according to claim 4 wherein said presenting portion is a visual display and said device at least partially displays said second potential next item during said time interval.

9. A device according to claim 8 wherein said device displays a progressively larger portion of said second potential next item through said predetermined time interval.

10. In a device having at least one control button, said device storing and presenting information items, said device organizing said information items in a data structure including parent lists and sub-lists, said sub-lists being indicated in an associated list by an associated sub-list indicator information item in said parent list, said sub-list indicators presenting a navigational branch point when traversing said data structure, a method of selecting and displaying at least one of said information items in response to actuation and release of said control button, said method comprising the steps:

designating one of said lists as a current list and a member of said current list as a current information item;

presenting said current information item;

designating a next member in said current list as a first potential next item to be presented;

if said current information item is a sub-list indicator information item, designating a member of the associated sub-list as a second potential next item to be presented;

monitoring actuation and release of said control button;

upon detecting actuation of said control button indicating that said second potential next item to be presented will be presented and beginning a predetermined time interval;

upon detecting release of said control button prior to expiration of said predetermined time interval designating as said current information item said first potential next item to be presented, and upon detecting release of said control button following expiration of said predetermined time interval designating as said current list said associated sub-list and designating as said current information item said second potential next item to be presented; and returning to said presenting step.

11. A method according to claim 10 wherein said presenting step comprising displaying said current information item.

12. A method according to claim 10 wherein said step of indicating that said second potential next item to be presented will be presented comprises the step of at least partially displaying said second next potential next item to be presented.

13. A method according to claim 12 wherein said step of at least partially displaying comprises displaying a progressively larger portion of said second potential next item to be presented through said predetermined time interval.

14. A method according to claim 13 wherein said step of displaying a progressively larger portion of said potential next item to be presented occurs concurrently with displaying a progressively smaller portion of said current information item.

* * * * *